United States Patent
Cofrade et al.

[11] Patent Number: 6,132,533
[45] Date of Patent: Oct. 17, 2000

[54] METHOD FOR MAKING ARCUATE COIL SPRINGS, RESULTING SPRINGS AND DEVICES FOR CARRYING OUT THE METHOD

[75] Inventors: Stanislas Cofrade, Joinville; Pascal Boudier, Cousances-les-Forges, both of France

[73] Assignee: Ateliers Metallurgiques de Saint Urbain (AMSU), Fronville, France

[21] Appl. No.: 08/836,668

[22] PCT Filed: Sep. 23, 1996

[86] PCT No.: PCT/FR96/01479

§ 371 Date: Jun. 12, 1997

§ 102(e) Date: Jun. 12, 1997

[87] PCT Pub. No.: WO97/11201

PCT Pub. Date: Mar. 27, 1997

[30] Foreign Application Priority Data

Sep. 22, 1995 [FR] France ................................ 95/11138

[51] Int. Cl.⁷ .................................. C21D 9/02; F16F 1/06
[52] U.S. Cl. ........................ 148/580; 148/645; 148/908; 29/896.91; 266/116; 266/274
[58] Field of Search ........................ 148/580, 645, 148/908; 266/116, 117, 259, 274, 275, 276, 279; 267/167; 428/52, 53, 595; 432/253, 261; 29/896.9, 896.91, 896.92

[56] References Cited

U.S. PATENT DOCUMENTS

| | | | |
|---|---|---|---|
| 3,912,224 | 10/1975 | Castoe | 254/10.5 |
| 3,935,630 | 2/1976 | Roy | 29/227 |
| 4,276,684 | 7/1981 | Mattson | 29/227 |
| 4,283,892 | 8/1981 | Brown | 52/213 |
| 4,478,445 | 10/1984 | Shimizu | 292/336.3 |

*Primary Examiner*—Sikyin Ip
*Attorney, Agent, or Firm*—Greenblum & Bernstein, P.L.C.

[57] ABSTRACT

The invention relates to a method for making arcuate coil springs from straight coil springs and particularly includes a phase of bending the straight springs during a heat treatment, which method provides exceptional results in that for the bending, a lasting arcuate shape is imparted to the springs substantially by giving the springs the shape of a portion of a turn to provide the spring with a counter-defect prior to the subsequent finishing steps. The invention also relates to a spring manufactured according to such a method and to devices for carrying out the method which include devices for holding at least the end coils of the springs in staggered positions, which devices may include a holder provided with fastening devices.

16 Claims, 3 Drawing Sheets

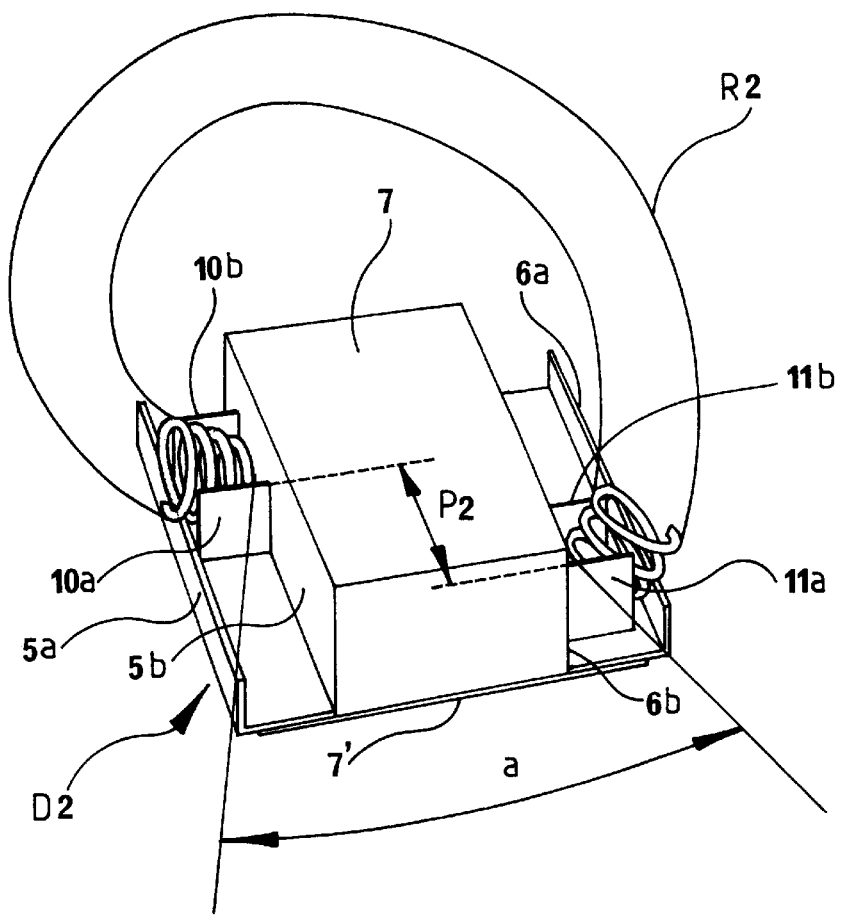
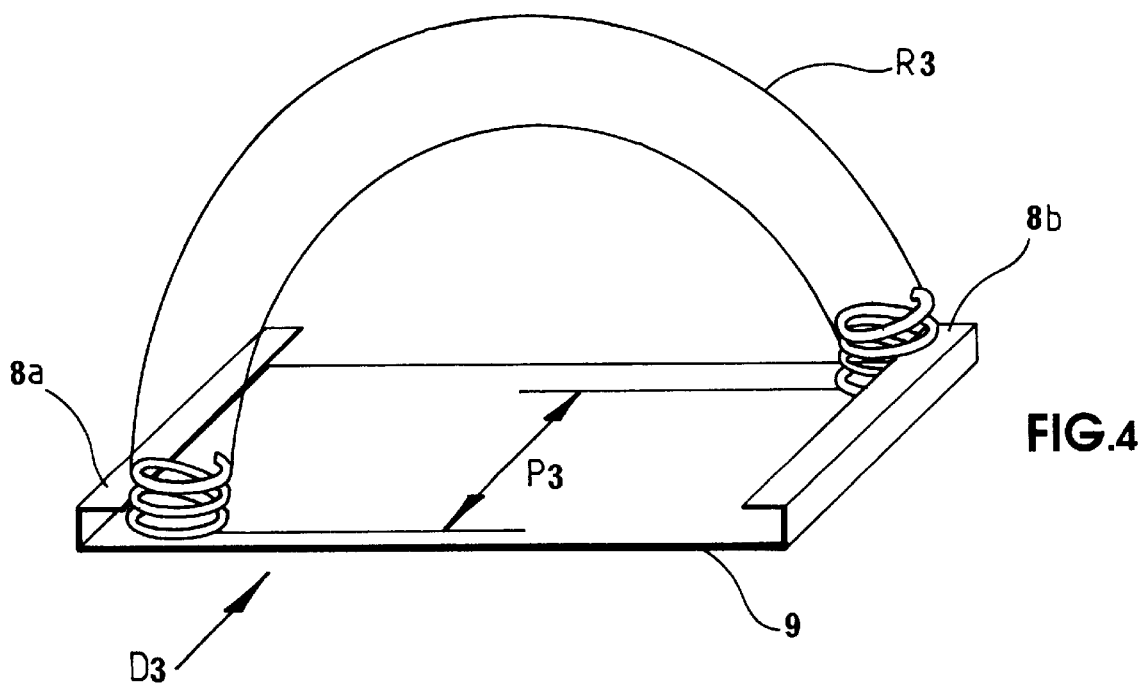

METHOD FOR MAKING ARCUATE COIL SPRINGS, RESULTING SPRINGS AND DEVICES FOR CARRYING OUT THE METHOD

BACKGROUND OF THE INVENTION

1. Field of the Invention

The invention relates to a method for making arcuate coil spring, the resulting springs and the necessary devices for carrying out this method.

2. Description of the Background Information

The arcuate coil springs are used in numerous mechanical systems which, in particular, require effects of returning and/or storing and restituting energy, as is the case, for example, in the clutching mechanisms referred to as "shock absorbing double flywheel", or automatic transmissions, vehicle suspensions, etc.

It is known to manufacture such arcuate springs through methods that consist essentially of a deformation beyond the yield point of the coils of the springs that are previously wound straight.

This deformation or bending is generally undertaken on the side which will constitute the external convex portion of the springs, by means of conical or wedge pieces, which are introduced between the coils.

Of course, numerous operations are provided upstream and downstream of this bending operation.

Before bending, it is for example known to perform a straight winding of the coils, a tempering phase (so-called expansion), the grinding of the ends, a prestress shot blasting of the straight springs, a heating and holding of close wound and hot coils.

In addition, after the aforementioned mechanical bending, the springs are hot stabilized, and are then scaled, i.e., controlled during torque in a given angular deformation, then possibly subjected to an anticorrosive treatment.

However, such a method has the disadvantage of causing marks on the surface of the spring wire, due to the very bending operation, as mentioned. Such marks can constitute the beginning of rupture.

Variations of the aforementioned method can be brought in the order of the operations. Thus, the bending performed in the aforementioned manner, for example, can be undertaken right after the winding, tempering and grinding operations, and then followed by the heating, holding of close wound and hot coils, shot blasting and reheating, to finish with the scaling and the possible anticorrosive coating.

However, while grinding after bending makes it possible to remove the traces of said bending, the incipient rupture remains.

One has also envisioned to perform a bending of the straight springs during a heat treatment, as described for example, in the documents WO-A-9106785 or EP 0 584 474. In the latter document, the spring is hot pressed at the winding temperature.

However, regardless of the method mentioned hereinabove, particularly in view of a subsequent shot blasting operation, the springs do not maintain a proper flatness (i.e., a proper flat contact of a generating line of the arcuate spring on a plane) because of the stresses brought by said shot blasting.

That is why the inventor has envisioned an original bending method, a different order of operations with, in addition, specific devices.

SUMMARY OF THE INVENTION

The method according to the invention, for making arcuate coil springs from straight coil springs and comprising in particular a phase of bending said straight springs during a heat treatment, is remarkable in that for the bending, a lasting arcuate shape is imparted to the springs substantially by giving them the shape of portion of a turn to provide the spring with a counter-defect prior to the subsequent finishing steps.

Quite advantageously, the heat treatment performed during bending corresponds to an expansion tempering operation, contrary to the aforementioned document EP 0 584 474, in particular.

Also advantageously, the lasting arcuate position of the springs is obtained by holding at least the end coils of said springs.

Such a method makes it possible, among others, to obtain a proper flatness of the finished spring.

Preferably, the tempering temperature is of about 350 to 450° C., and the position is maintained for about four to a hundred twenty minutes.

Of course, other operations are provided before and after bending. Thus, said bending operation, for example, is generally preceded by an operation of grinding the end coils of the straight springs, and possibly by a first operation of heating the straight springs at a temperature of about 180 to 220° C. for about twenty to forty minutes.

After bending, the following successive operations can be provided: prestress shot blasting, heating and holding close wound and hot coils, control of the scaling torques, which operations are possibly completed by an anticorrosive coating operation.

Of course, the invention also relates to an arcuate coil spring manufactured according to the aforementioned method.

To implement the method, the invention provides a device that is characterized in that it comprises means for holding at least the end coils of the springs in staggered positions, substantially to give the spring the shape of a portion of a turn.

The device can have the form of a cylindrical annular box in which each spring is introduced so that a lasting arcuate shape is imparted thereto over its entire length, or the form of a holder provided with fastening means for the end coils of the springs.

According to an alternative embodiment, it can also have the form of a non-rectilinear pin whose ends are adapted to be introduced in the end coils of the springs, or the form of a pin made of two parts, in which the ends on one side of said parts are adapted to be introduced in the end coils of the springs, while the other free ends can be connected to one another by a fastening member.

Preferably, the devices are metallic and thermally treated.

BRIEF DESCRIPTION OF THE DRAWINGS

The above and other features and advantages of the present invention will be made apparent from the following description of the preferred embodiments, given as non-limiting examples, with reference to the accompanying drawings in which:

FIG. 3 shows another device in the form of a holder for the ends of the springs;

FIG. 4 shows an embodiment in the form of a variation of FIG. 3;

DETAILED DESCRIPTION OF THE PREFERRED EMBODIMENTS

Figure 1:
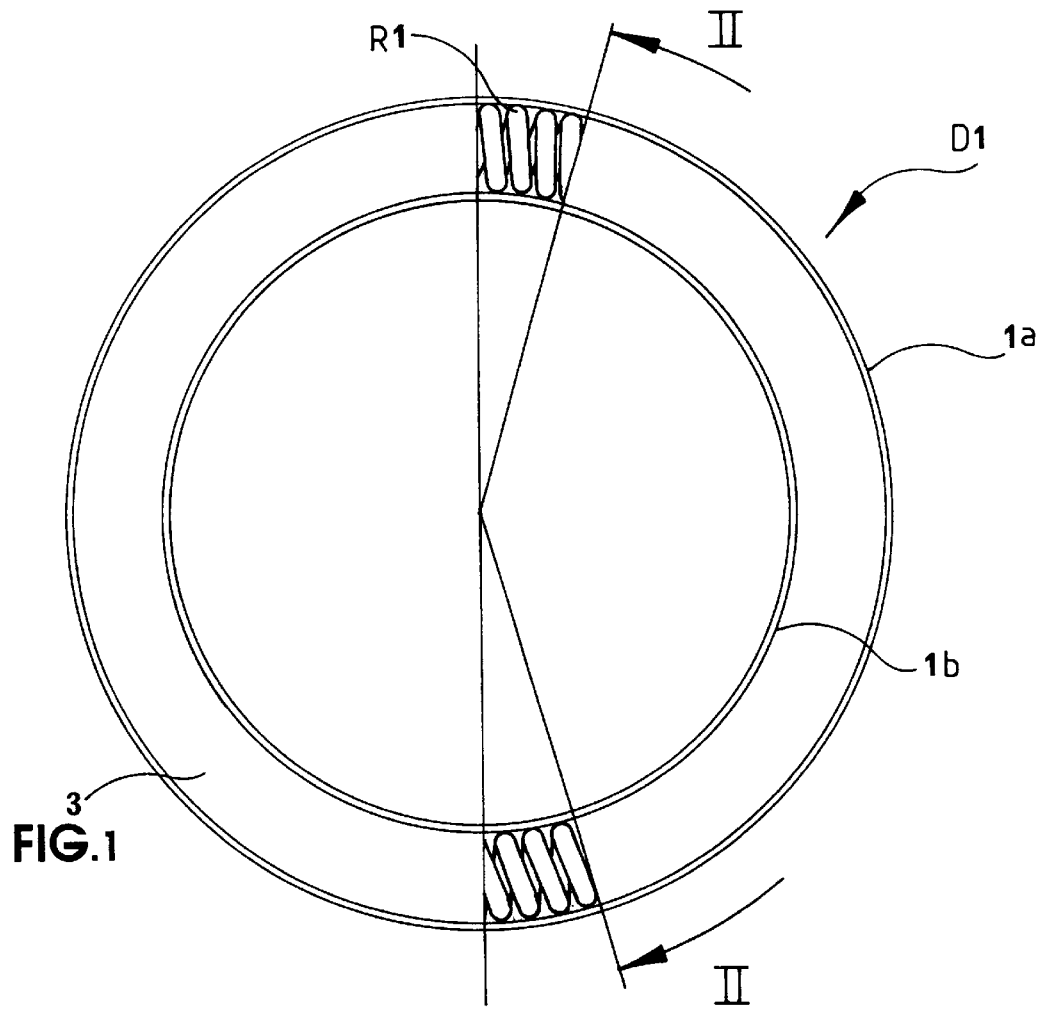
FIG. 1 shows a top view of a device according to the invention, in the form of an annular box.

The complete and advantageous method according to the invention, after the winding of each straight spring, therefore consists of: grinding each end of the spring, bending the spring, as will be explained hereinafter, during the same tempering phase at a temperature comprised between 350 and 450° C., and for a duration of four to a hundred twenty minutes, then undertaking a prestress shot blasting of the arcuate springs in one or two operations, reheating at temperatures of about 180 to 280° C., then holding the close wound springs (by compressing the arcuate spring) and at the aforementioned temperature, then controlling the scaling torques and possibly, providing an anticorrosive coating.

As previously mentioned, a heating operation (or expansion tempering) can be performed at a temperature of 180 to 220° C. for about twenty to forty minutes before the bending operation, and more precisely between the winding operation and the grinding operation.

The bending operation is therefore performed during the tempering phase under the aforementioned conditions, by imparting a lasting arcuate shape to the springs and, advantageously, by holding at least the end coils of the springs.

To this end, a plurality of devices have been envisioned by the inventor, at least certain of which are shown in the drawings. These devices are arranged to hold at least the ends of the springs with a staggering or misalignment of the latter.

Figure 2:
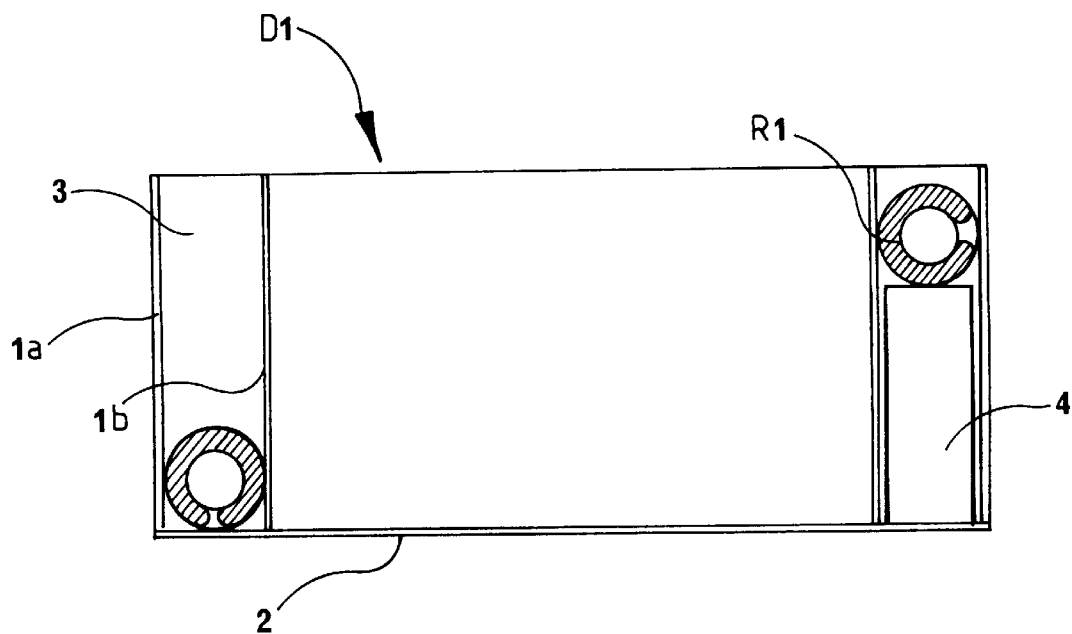
FIG. 2 is a cross-section along II—II of FIG. 1.

FIGS. 1 and 2 show a first device $D_1$, in the form of a box constituted by two concentric tubes $1a$, $1b$, connected to one another by a base 2 (FIG. 2), and providing therebetween an annular space 3 adapted to receive a spring $R_1$.

It is clear that the aforementioned annular space is calculated as a function of the diameter of the springs to receive.

Each spring can be introduced from the top, when considering FIG. 2, which top can possibly be provided with a lid.

In order to create a counter-defect, as mentioned hereinabove, a wedge 4 (FIG. 2), for example, can be provided so as to give the spring the shape of a portion of a turn.

The box or device $D_1$, shown is circular, but it could be oval.

The devices $D_2$ and $D_3$ of FIGS. 3 and 4 are holders provided with fastening means for the end coils of the springs which are referenced here as $R_2$ and $R_3$.

The fastening means are, for example, constituted by parallel walls (they could be slightly oblique with respect to one another) such as $5a$, $5b$; $6a$, $6b$ (FIG. 3) and $8a$, $8b$; $9$ (FIG. 4), between which the end coil or coils (two for example) are fastened as shown in the drawings.

In addition, for the device $D_2$, lateral walls $10a$, $10b$; $11a$, $11b$, are provided, the whole extending here from a folded metal plate 7 possibly provided with a base 7'.

One can note that, as previously, a counter-defect is created by giving a shape of a turn to the spring, such as a turn of a helix (as apparent from viewing FIGS. 3 and 4), by staggering the ends, here by a value $P_2$ for $D_2$ and $P_3$ for $D_3$. Furthermore, it can be noted that with the device $D_2$ of FIG. 3, the two ground ends of the spring $R_2$ create an angle "a" therebetween, that is a function of the desired geometry for the the spring, whereas in the device $D_3$ of FIG. 4, the ends of the spring $R_3$ are parallel spring $R_3$ are parallel while in support on the same wall 9.

Figure 5:
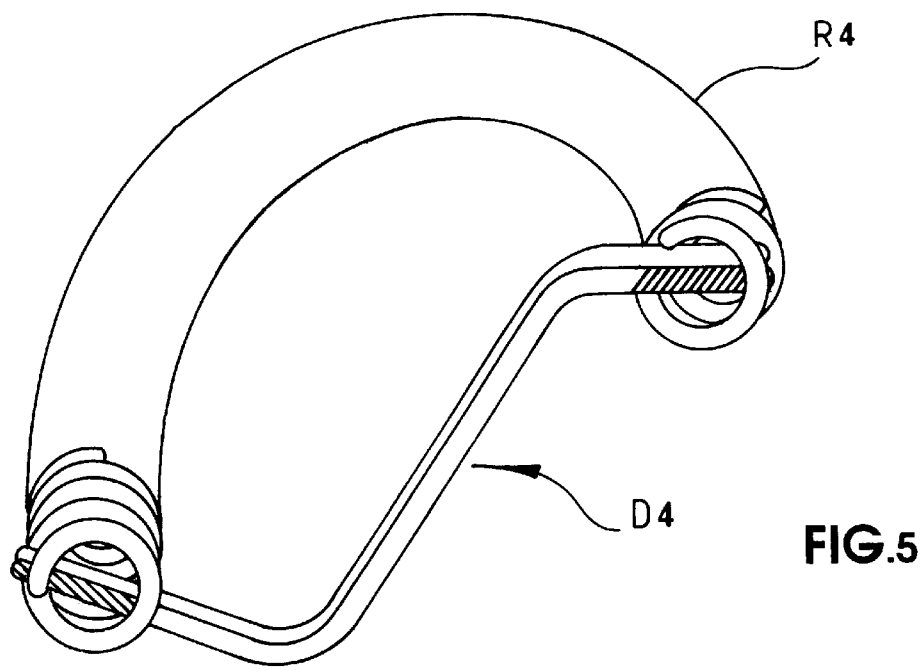
FIG. 5 shows a device in the form of a non-rectilinear pin.

In FIG. 5, one can see a device $D_4$ in the form of a non-rectilinear pin, and whose shape is appropriate to provide the spring $R_4$ with the desired shape (arcuate shape and shape of a turn).

The pin $D_4$ here has a square section while each end is adapted to be fastened in one or two end coils of the spring $R_4$.

The pin $D_4$ thus exerts, on the ends of the spring $R_4$, a torque on one or two coils along an axis constituted by a diameter of the end coil.

Figure 6:
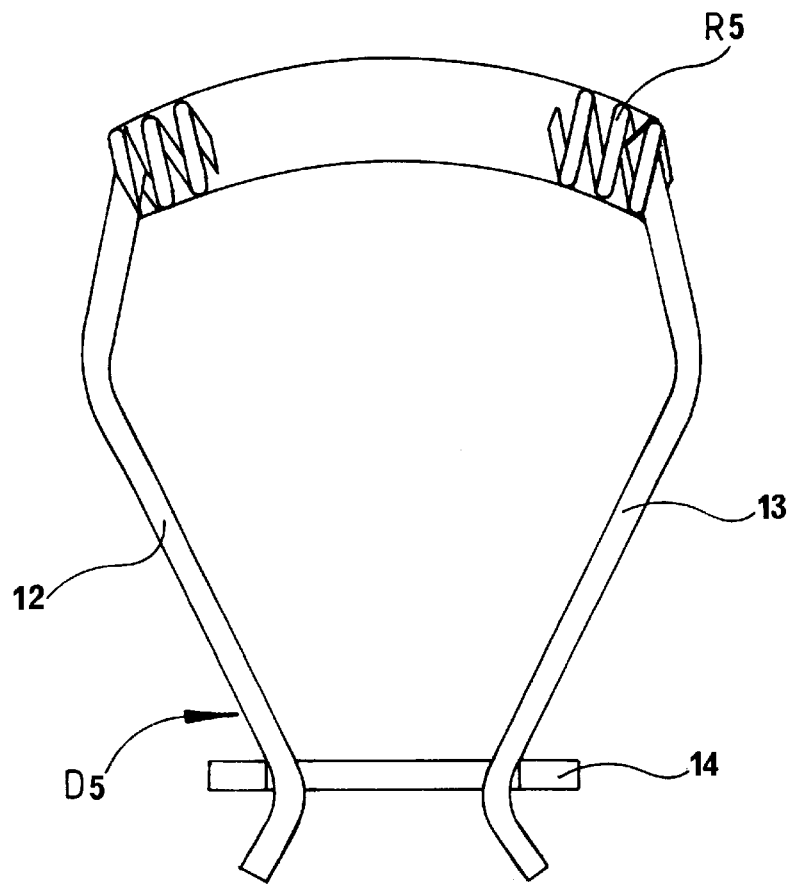
FIG. 6 shows a device in the form of a pin made of two distinct parts.

The device $D_5$ of FIG. 6 for a spring $R_5$ is a pin made of two distinct parts 12, 13.

One of the ends of each part 12, 13, is adapted, as previously, to engage with one or two coils of the spring $R_5$, while the other ends are adapted to be connected to one another in a releasable manner by means of a fastening member 14, which is here in the form of a single ring, such that the spring $R_5$, of the device $D_5$ can be easily installed and removed.

This last device is more particularly adapted for springs that are short and have a large radius of curvature.

To facilitate the positioning of the springs in the devices, an automatic apparatus can be utilized to arcuate said springs, this device comprising, for example, a rotative jack that follows an evolute in the shape of a turn.

Of course, the aforementioned devices or tools must have the required resistance and dimensions to enable proper reproducibility of the finished products, the latter being capable of being preferably made of metal with a good mechanical strength acquired through an adequate heat treatment.

It is also clear that the various parameters of the method described hereinabove, as well as the dimensions and shapes of the devices for its implementation are determined as a function of the characteristics of the arcuate springs to obtain.

What is claimed is:

1. A method for making arcuate coil springs from straight coil springs comprising:

forming a straight coil spring during heat treatment to have an arcuate shape; and providing the arcuate shaped spring with a counter-defect prior to subsequent finishing steps, wherein said counter-defect is formed by bending the arcuate shaped spring to result in a shape having a portion of a turn.

2. The method according to claim 1, wherein said heat treatment performed during bending corresponds to an expansion tempering operation.

3. The method according to claim 2, wherein said tempering temperature is about 350 to 450° C.

4. The method according to claim 2, wherein said tempering operation in the maintained position has a duration of about 4 to 120 minutes.

5. The method according to claim 1, wherein the bending is preceded by grinding the end coils of the straight springs.

6. The method according to claim 1, wherein the bending is preceded by a first operation of heating the straight spring.

7. The method according to claim 6, wherein said first heating operation is performed at a temperature of about 180 to 220° C. for about 20 to 40 minutes.

8. The method according to claim 1, wherein said bending is completed by the following successive operations: pre-stress shot blasting, heating and holding of close wound and hot coils, and control of scaling torques.

9. The method according to claim 8, wherein said method is completed by an anticorrosive coating operation.

10. The method according to claim 1, further comprising: providing a holding device that holds the end coil at one end of the spring in a position offset from the end coil at the other end of the spring, such that the arcuate spring takes the shape of a portion of a turn.

11. The method according to claim 10, wherein said holding device further comprises fastening elements for fastening the end coils of the spring.

12. The method according to claim 10, wherein said holding device is configured as a non-rectilinear pin having ends adapted to be introduced into the end coils of the spring.

13. The method according to claim 10, wherein said holding device is configured as a pin formed from two parts, wherein the ends on one side of said parts are adapted to be introduced into the end coils of the spring, while the free ends of said parts are adapted to be connected to one another by a fastening member.

14. The method according to claim 10, wherein said holding device is metallic and is thermally treated.

15. The method according to claim 1, wherein said counter-defect imparted to the arcuate shaped spring is obtained by holding at least the end coils of said arcuate shaped spring.

16. A method for making arcuate coil springs from straight coil springs comprising:

forming a straight coil spring during heat treatment to have an arcuate shape; and providing the arcuate shaped spring with a counter-defect prior to subsequent finishing steps, wherein said counter-defect is formed by bending the arcuate shaped spring to result in a shape having a portion of a turn, and a device for carrying out the method comprising: a holding device that holds the end coil at one end of the spring in a position offset from the end coil at the other end of the spring, such that the arcuate spring takes the shape of a portion of a turn, and wherein said holding device is configured in the form of a cylindrical annular box for receiving a spring, such that a lasting arcuate shape is imparted thereto over the entire length thereof, and further comprising a mechanism positioned within said cylindrical annular box to ensure the offsetting of at least the end coils of the spring.

\* \* \* \* \*